Feb. 11, 1930.  C. F. KRAUSS ET AL  1,747,118
SPRING SUPPORT FOR TRUCKS
Filed April 2, 1929
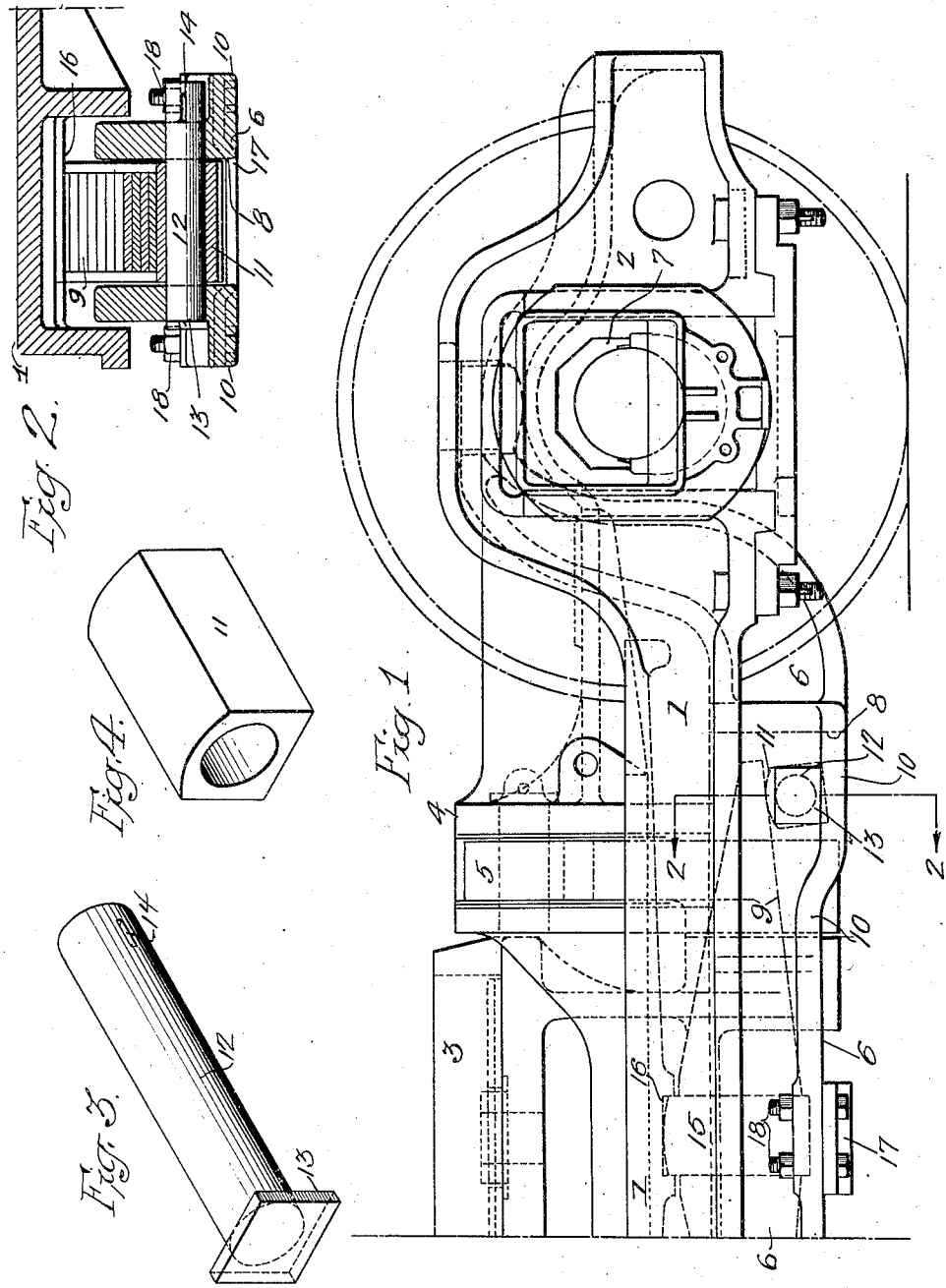
Inventors:
Charles F. Krauss.
Henry K. Harwick.
by Their Attorneys
Howson & Howson Patented Feb. 11, 1930

1,747,118

UNITED STATES PATENT OFFICE

CHARLES F. KRAUSS, OF AMBLER, AND HENRY K. HARWICK, OF DARBY, PENNSYLVANIA

SPRING SUPPORT FOR TRUCKS

Application filed April 2, 1929. Serial No. 351,965.

The object of our invention is to provide supports for the springs of locomotive and car trucks which can be detached for the ready removal of the springs when necessary.

In the accompanying drawing:

Fig. 1 is a side view of sufficient of a locomotive front truck illustrating our invention;

Fig. 2 is a sectional view on the line 2—2, Fig. 1;

Fig. 3 is a perspective view of the pin; and

Fig. 4 is a perspective view of the bearing block.

The truck frame 1 has the usual pedestals 2 for the axle boxes. The centre bearing 3 of the truck is carried by the cross-ties 4, which are part of the frame 1, by links 5.

The equalizing bar 6 is located between the inner and outer members of the frame 1 and extends over the axle boxes 7 located between the pedestals 2. The bar 6 is solid at both ends and has an elongated opening 8 at the center for the reception of the spring 9. The bar has flanges 10 at each side as shown in Fig. 2. The ends of the spring 9 rest upon bearing blocks 11 which are mounted upon round pins 12 adapted to openings in the equalizing bar 6.

Each pin has a rectangular head 13, one side of which rests upon one of the flanges 10 of the bar, Fig. 2, and prevents the pin turning in the bar.

A cotter pin is inserted in the slot 14 in the pin, retaining it in position. Each block 11 is free to turn on its pin and has a rounded upper surface forming a seat for the end of the spring 9.

The center strap 15 of the spring 9 rests on a spring seat 16 in the frame 1. Thus the weight of the frame and its connected parts are carried by the equalizing bars through the springs 9.

Extending from one side member of the equalizing bar to the other side member is a safety strap 17 which is secured to the flanges 10—10 of the bar by bolts 18. This strap retains the spring in position in the bar 6 should the spring-leaves break or the blocks become damaged from any cause.

When it is necessary to remove a spring, the strap 17 is detached; then the spring is supported in any manner, while the pins 12, which support the ends of the spring, are withdrawn, after which the spring is lowered through the opening 8 in the bar 6. While we prefer to locate the detachable bearing blocks at each end of the spring, one of the bearings may be fixed and the other made removable.

We claim:—

1. The combination of a truck frame, having a spring seat; an equalizing bar having an open centre for the reception of a spring; spring bearings on the bar, one of said spring bearings being removable; and a spring resting on the bearings and carrying the truck frame.

2. The combination of a truck frame, having a spring seat; an equalizing bar having an open centre for the reception of a spring; a detachable bearing block; a removable pin extending across the opening in the bar and on which the block is mounted; and a spring carried by the equalizing bar and supporting the frame, one end of the spring resting upon the block.

3. The combination of a truck frame, having a spring seat; an equalizing bar having an open centre; a detachable bearing block; a removable pin on which the block is mounted; a spring carried by the equalizing bar and supporting the frame, one end of the spring resting upon the block; and a safety strap secured to the bar and extending across the opening therein and under the spring.

4. The combination in a locomotive truck, of a frame having double side members; a bolster hung from said frame; an equalizing bar at each side of the truck and located between the side members thereof, each of said bars having an extended slot therein; a spring located in the slot of each bar and supporting the frame, the outer end of the spring being carried by the bar; a bearing block at one end of the bar for the spring; a transverse pin on which the block is mounted; and means preventing the pin turning in the bar.

CHARLES F. KRAUSS.
HENRY K. HARWICK.